INVENTORS
Arthur H. Youmans &
Eric C. Hopkinson
BY Douglas M. Clarkson
ATTORNEY

Dec. 30, 1969   A. H. YOUMANS ET AL   3,487,294

DIFFERENTIAL PHASE SHIFT INDUCTION WELL LOGGING SYSTEM

Filed Jan. 22, 1968   2 Sheets-Sheet 2

INVENTORS
Arthur H. Youmans &
Eric C. Hopkinson

BY Douglas M. Clarkson
ATTORNEY

United States Patent Office 3,487,294
Patented Dec. 30, 1969

3,487,294
DIFFERENTIAL PHASE SHIFT INDUCTION WELL LOGGING SYSTEM
Arthur H. Youmans and Eric C. Hopkinson, Houston, Tex., assignors to Dresser Industries, Inc., Dallas, Tex., a corporation of Delaware
Filed Jan. 22, 1968, Ser. No. 699,715
Int. Cl. G01v 3/12
U.S. Cl. 324—6                     9 Claims

ABSTRACT OF THE DISCLOSURE

This specification discloses an induction well logging system in which a high frequency alternating magnetic field is applied to the formation surrounding a borehole. A receiver coil system develops an A-C signal as a result of the eddy currents in the surrounding formations. Phase sensitive means detect the amplitude of the in-phase component of the signal induced in the receiver coil system leading the transmitting signal by a preselected angle, such as 15 degrees and detects the amplitude of the in-phase component lagging the transmitting signal by a similar angle. The respective output signals are intercompared after passing through non-linear amplifiers which alter the respective signals to approximate the values that would be expected in infinite homogeneous beds in the absence of "skin effect." The difference between the respective derived signals will indicate radial gradient in conductivity of the formation surrounding the borehole. The respective signals are recorded as a function of depth in the borehole.

BACKGROUND OF THE INVENTION

The present invention, generally, relates to induction logging systems for investigating earth formations traversed by a borehole and, more particularly, to an induction logging system which will provide a reliable indication of the presence and magnitude of radial gradients or discontinuities in conductivity of the formation surrounding the borehole.

Induction well logging is a valuable aid in investigating formation surrounding a borehole because of the very great radius of investigation that is achieved. In inductive well logging, a high frequency alternating current (A-C) signal is applied to a transmitting coil, which is moved through the borehole. The transmitting coil will apply an alternating magnetic field to the formation causing induced voltages to produce eddy currents in the formation surrounding the borehole. These eddy currents, in turn, will induce an A-C signal in a receiver coil moved through the borehole to provide an indication of the conductivity of the formations surrounding the borehole.

Induction well logging is reduced in effectiveness because the borehole fluid normally has a conductivity different from the conductivity of the fluid contained in the formation surrounding the borehole and different from the conducitvity of the formations themselves. Moreover, this borehole fluid invades zones near the borehole, making the conductivity of the invaded zones different from that of the uninvaded formations. The problem is made more acute because an induction logging system tends to be more sensitive to the conductivity of nearby materials and, therefore, tends to be more sensitive to materials in the invaded zones rather than remote materials or the uninvaded zones, about which conductivity information is desired.

The conventional approach for overcoming this undesirable tendency of induction well logging to measure the conductivity of nearby materials has been to employ coil system design wherein a plurality of coils are arranged in such a way as to effectively cancel out much of the effect of the nearby materials. The present invention provides a different approach for overcoming the problem, while also permitting the collection of additional valuable information concerning the radial gradient of conductivity of the formations.

SUMMARY OF THE INVENTION

In accordance with the present invention, the signal received by the receiving coil system is analyzed to determine the effect of the radial gradient of conductivity on the received signal. The present invention is based on the fact that the phase and the amplitude of the received signal can be computed for any given formation conductivity, assuming that such formation is an infinite homogeneous bed having uniform conductivity.

In accordance with a preferred form of the present invention, the amplitude of components of a received singal, leading and lagging the transmitted signal by predetermined angles, are measured. Because both the phase and the amplitude of a received signal are known functions of the conductivity of the formation, each of the measured components can be corrected for the losses that would occur in infinite homogeneous beds. By the present invention, the corrected signal components are recorded as a function of depth in the borehole.

If the formation surrounding the borehole approximates an infinite homogeneous bed, as would be the case with very lightly invaded formations or with very deep invaded zones, the recorded signals will be equal. However, when invaded zones surrounding the borehole cause a significant radial gradient in the conductivity so that the surrounding formations do not approximate an infinite homogeneous bed, the two signals will not be equal. The extent that the two signals differ from each other will be a measurement of the effect of the invaded zones on the received signals. Once this effect is known, the conductivity of the surrounding formations can then be determined accurately by taking into account the effect of the invaded zones.

Accordingly, an object of the present invention is to provide an improved induction well logging system.

Another object of the present invention is to provide a well logging system which determines the effect of invaded zones on the received signal.

Still another object of the present invention is to overcome the problem of inaccuracies in induction well logging caused by the effect of invaded zones on the received signal.

A further object of the present invention is to provide a system for analyzing the received signal in an induction well logging system to determine the effect of invaded zones on the received signal.

Still further objects and advantages of the present invention will become readily apparent as the following detailed description of the invention unfolds and when taken in conjunction with the drawings.

DESCRIPTION OF THE PREFERRED EMBODIMENTS

Figure 1:
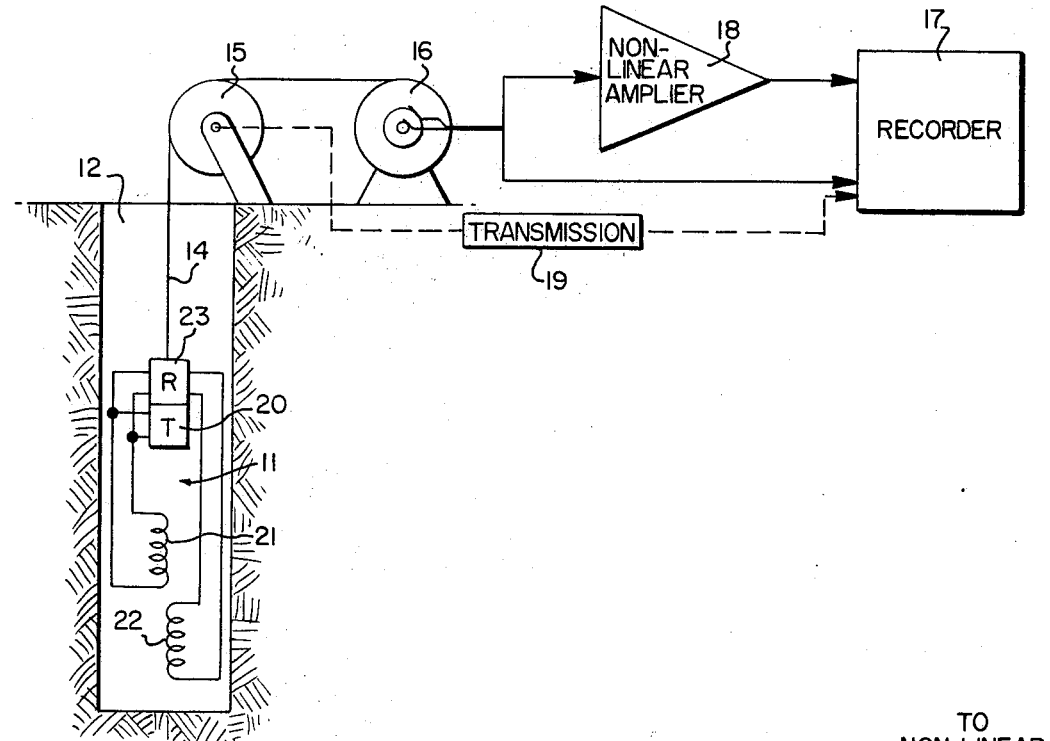
FIG. 1 is a schematic diagram illustrating the induction logging system of the present invention.

As shown in FIG. 1 of the drawings, a logging instrument 11 is suspended in a borehole 12 by means of a cable 14. The cable passes over a pulley 15 and is wound upon a winch 16 which will operate to raise or lower the logging instrument 11 in the borehole. Signals produced by the logging instrument 11 are transmitted through the cable 14 to a recorder 17 via slip rings on the winch 16. One of the signals is corrected by a nonlinear amplifier 18 in a manner explained hereinafter. The recorder 17 is driven from the pulley 15 through a transmission 19 so as to record the applied signals as a function of depth in the borehole.

The logging instrument 11 includes a transmitter 20, which applies a high frequency A-C signal in the range of 20 to 50 kilocycles to a transmitting coil 21. The transmitting coil 21 applies an alternating magnetic field to the formation surrounding the borehole, and the resulting induced voltage developes eddy currents in the formation. The eddy currents developed in the surrounding formation induce an electrical signal in a receiving coil 22, also forming part of the logging instrument 11. The received signal detected by the receiving coil 22 will be of the same frequency as that of the transmitted signal and will have an amplitude and phase depending upon the conductivity of the surrounding formation.

Preferably, the transmitting coil 21 is composed of a system of coils, and the receiving coil 22 is made up of a system of coils arranged, respectively, to cancel the mutual inductance effects which otherwise would produce a signal in the receiving coil even in the absence of a conductive medium surrounding the instrument.

When the surrounding formation is infinite and homogeneous, the amplitude and phase of the received signal both would be unique known functions of the conductivity of the formation, and accordingly, the amplitude of the signal can be computed from the phase and vice versa. In the usual case, however, the surrounding formation does not even approximate an infinite homogeneous bed, because the borehole fluid and the surrounding zones invaded by the borehole fluid normally will not have the the same conductivity as the undisturbed formation. Because of the invaded zones, the phase of the received signal will not bear the same relationship to the amplitude that it would for a homogeneous infinite bed. The present invention makes use of this difference in relationship of the phase and amplitude of the received signal to determine the effect of the invaded zones on the received signal and, thereby, make is possible to determine the conductivity of the undisturbed formation.

The signal detected by the receiving coil system 22 is applied to a receiver circuit 23 forming part of the logging instrument 11. The receiver circuit 23 detects the amplitude of components of the received signal lagging and leading the transmitted signal by selected phase angles. The details of the receiver circuit 23 are illustrated in the block diagram of FIG. 2.

Figure 2:
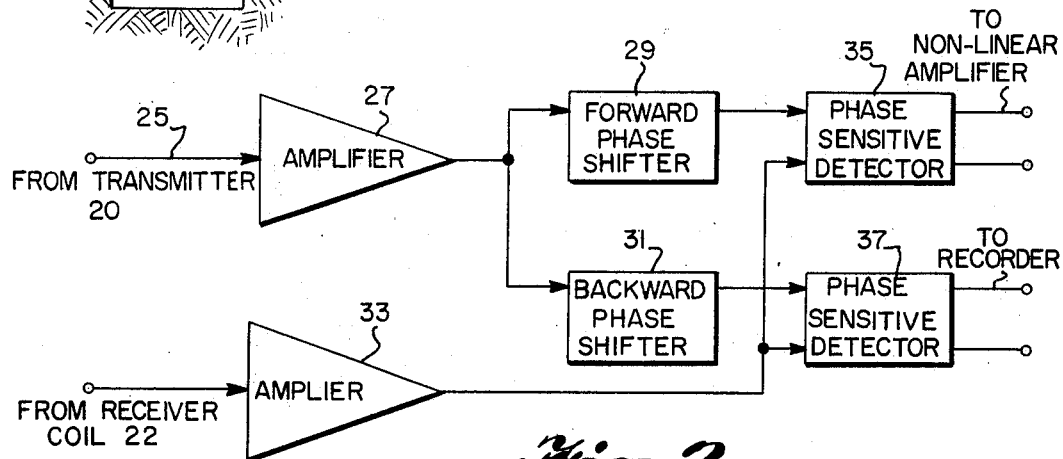
FIG. 2 is a block diagram illustrating circuitry in the system of the present invention.

As shown in FIG. 2, the transmitting signal is applied to the receiver over an input channel 25 and serves as a reference signal. This reference signal is amplified by an amplifier 27 and is applied to a phase shifter 29 and to a phase shifter 31. The phase shifter 29 shifts the reference signal forward in phase by a preselected amount, for example 15 degrees, and the phase shifter 31 shifts the applied signal back in phase by a similar amount.

The signal detected by the receiver coil system 22 is amplified by an amplifier 33 an d is applied to phase sensitive detectors 35 and 37 respectively. The phase sensitive detector 35 also receives the output signal of the phase shifter 29 and produces a direct current (D-C) output signal having an amplitude corresponding to the amplitude of the component of the signal received from the amplifier 33 that is in phase with the signal applied from the phase shifter 29. Accordingly, the phase sensitive detector 35 will produce an output signal representing the amplitude of the component of the received signal which leads the reference signal by the preselected 15 degrees.

The phase sensitive detector 37 also receives the output signal of the phase shifter 31 and will produce a D-C output signal having an amplitude corresponding to the amplitude of the component of the signal received from the amplifier 33 that is in phase with the signal received from the phase shifter 31. Accordingly, the output signal of the phase sensitive detector 37 will represent the amplitude of the component of the received signal lagging the reference signal by 15 degrees.

Figure 3:
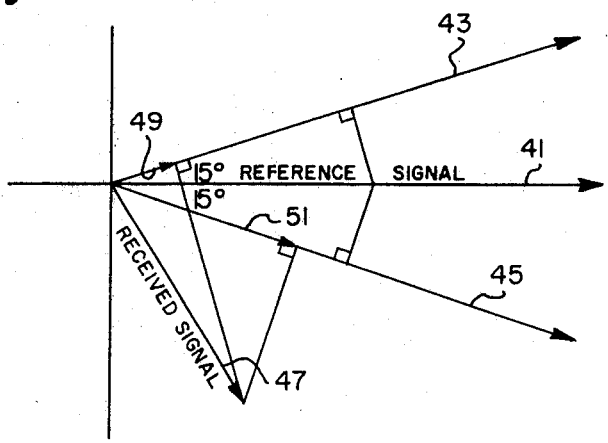
FIG. 3 is a vector diagram illustrating phase relationships between the transmitted and received signal and is provided to illustrate the principles of operation of the present invention.

FIG. 3 is a vector diagram illustrating the operation of the receiver of FIG. 2. As shown in FIG. 3, the vector 41 represents the reference signal, which as pointed out above is obtained from the transmitted signal. The output signal of the phase shifter 29 is represented by the vector 43, which leads the vector 41 by 15 degrees. The output signal of the phase shifter 31 is represented by the vector 45, which is shown lagging the reference singal 41 by 15 degrees. The received signal, because of propagation effects, will always lag the transmitted signal. The vector 47 represents the received signal and, as shown, lags the reference signal vector 41.

The component of the received signal which is in phase with the output signal of the phase shifter 29 is represented by the vector 49, and the amplitude of the component, represented by the vector 49, is represented by the amplitude of the output signal of the dector 35. The component of the received signal that is in phase with the output signal of the phase shifter 31 is represented by the vector 51, and the amplitude of the component, represented by the vector 51, is represented by the amplitude of the output signal of the phase sensitive detector 37.

Prior to lowering the logging instrument 11 into the borehole, a resistance calibrating loop is placed around the receiving coil. The calibrating loop will cause a signal to be induced in the receiver coil in phase with the transmitting signal. Accordingly, the output singals of the two phase detectors 35 and 37 should be equal. If they are not equal, adjustments are made to the system to make the two signals equal.

The system may be checked further by means of a condenser loop which, when placed around the receiver coil, will cause a signal 90 degrees out of phase with the transmitting signal to be induced in the receiver coil 22. Accordingly, in response to the condenser loop, the output signals of the two phase detectors 35 and 37 should be equal in amplitude but of opposite polarities.

If the instrument, when in a closely fitting borehole, were surrounded by an infinite homogeneous bed, the phase angle by which the received signal would lag behind the transmitting signal and the amplitude of the received signal would be calculatable non-linear functions of the conductivity of the infinite homogeneous bed. The relationship of the amplitude and phase of the received signal to the conductivity of the surrounding infinite homogeneous bed is disclosed in an article entitled "The Effect of Coil Design on the Performance of the Induction Log" by W. C. Duesterhoeft, Jr., Ralph E. Hartline, and H. Sandoe Thomsen, in the November 1961 issue of the Journal of Petroleum Technology, beginning on p. 1137.

Because the amplitude and phase of the received signal are known functions of the conductivity of an infinite homogeneous bed, the phase of the received signal could be determined from the amplitude of the received signal if the formation surrounding the borehole were an infinite homogeneous bed. Similarly, the amplitude of the received signal could be determined from the phase angle of the received signal, and the conductivity of the infinite homogeneous bed could be determined from either the amplitude or the phase angle of the received signal.

It follows, therefore, that the conductivity of an infinite homogeneous bed can be determined from the amplitude of any measured component of the received signal which leads or lags the transmitted signal by a predetermined angle.

Thus, the conductivity of an infinite homogeneous bed can be determined from the amplitude of the component of the received signal which leads the transmitted signal by 15 degrees detected by the detector 35 and can be determined from the amplitude of the component of the received signal which lags the transmitted signal by 15 degrees detected by the detector 37. By the same token, the signal detected by the detector 35 can be determined (for an infinite homogeneous bed) if the signal that is detected by the detector 37 is known, and vice versa. Therefore, it follows that the output of either the phase sensitive detector 35 or the phase sensitive detector 37 can be modified to equal the output of the other for all infinite homogeneous beds.

This function is performed in the system of the present invention by the non-linear amplifier 18, which is connected to amplify the output of the phase sensitive detector 35. The output of the phase sensitive detector 35 will be of a lower amplitude than the output of the phase sensitive detector 37, because of the greater angle that will exist between the received signal and the component detected by the phase sensitive detector 35 then will exist between the received signal and the component detected by the phase sensitive detector 37. The gain characteristic of the non-linear amplifier is selected so that its output signal will equal the output signal of the phase sensitive detector 37 for all infinite homogeneous beds. Thus, the non-linear amplifier 18 serves as an analog signal correction means.

In the usual case, the formations surrounding the borehole will not approximate an infinite homogeneous bed, because the borehole fluid will not have the same conductivity as the undisturbed surrounding formation, and the borehole fluid will invade zones in the formations surrounding the borehole. As a result, the phase and the amplitude of the received signal will not have the same relationship that they would if the surrounding formation were an infinite homogeneous bed, and accordingly, the output signal of the non-linear amplifier 18 will not equal the output signal of the phase sensitive detector 37.

The amount that the output signal of the non-linear amplifier 18 departs from the output signal of the phase sensitive detector 37 will be an indication of the effect of the invaded zones on the received signal. The difference between the signals can be used as a measure of the extent of the invaded zones surrounding the borehole, and thus, the apparent conductivity is expected to differ from the true conductivity of the undisturbed zones.

Instead of amplifying the output signal of the phase sensitive detector 35 with a non-linear amplifier, the output signal of the phase sensitive detector 37 could be applied to a non-linear attenuator, the characteristic of which is selected so that its output signal as a function of bed conductivity, would equal the output signal of the phase sensitive detector 35 for all infinite homogenous beds. Alternatively, the output signals of both phase sensitive detectors can be corrected so that they are equal for infinite homogeneous beds of all conductivities.

Figure 4:
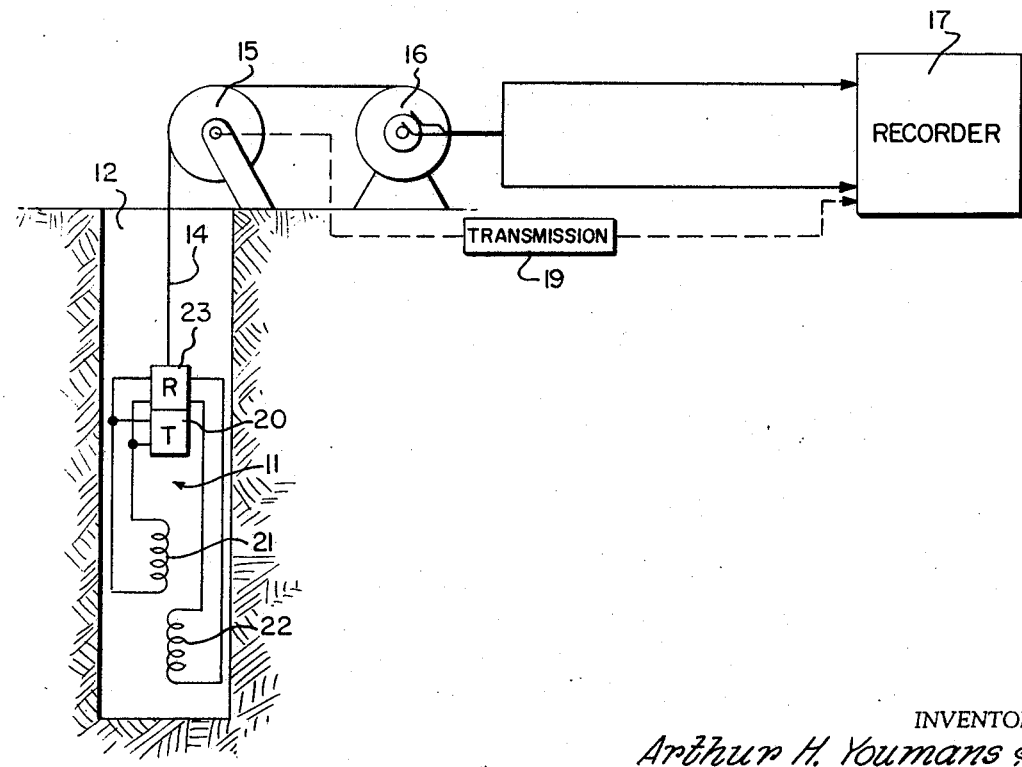
FIG. 4 is a schematic diagram illustrating an alternative embodiment of the present invention.

FIG. 4 illustrates an alternative embodiment, which is similar to that of FIG. 1, except that the output signals of both phase sensitive detectors are recorded without modification. In this embodiment, one of the recorded signals is corrected by calculation to equal the other after recording.

The inventive concept is not limited to using phase angles of 15 degrees leading and lagging transmitting signals. These phase angles are selected because they are sufficiently small to ensure that a slight inaccuracy in the phase angle will not have a disproportionately large effect on amplitude of the signal component that is detected. On the other hand, the two components which are detected 30 degrees apart are sufficiently different that a radial gradient in the conductivity will cause a significant difference in the output signals.

The above description is of preferred embodiments of the invention, and many modifications may be made thereto without departing from the spirit and scope of the invention, which is defined in the appended claims.

What is claimed is:

1. An induction well logging system comprising:
  a logging instrument adapted to be moved through a borehole including a transmitting coil,
  means to apply an alternating current transmitting signal to said coil to cause said coil to apply an alternating magnetic field in the formation surrounding said borehole,
  receiving means to receive an induced alternating current signal from said formation as a result of the alternating magnetic field applied to said formation,
  phase sensitive detecting means coupled to said receiving means for detecting the amplitude of first and second components of the signal received by said receiving means displaced in phase from one another by less than 90 degrees, means for deriving a reference signal from said transmitting signal, and phase shifting means coupled to said reference signal deriving means for providing first and second modified reference signals to said phase sensitive detecting means, the phase of one of said modified reference signals being shifted forward of the phase of said reference signal and the phase of the other of said modified reference signals being shifted backward of the phase of said reference signal, wherein said phase sensitive detecting means detects the amplitude of a component of said signal leading said transmitting signal by a predetermined angle and detects the amplitude of a component of said signal lagging said transmitting signal by said predetermined angle.

2. An induction well logging system as recited in claim 1 wherein said predetermined angle is about 15 degrees.

3. An induction well logging system as recited in claim 1 wherein there is provided means to record the amplitude of said components detected by said phase sensitive detecting means.

4. An induction well logging system as recited in claim 1 including correcting means connected to said detecting means responsive to the amplitude of at least one of said components to derive a first output signal from said first component and a second output signal from said second component which would be equal to said first output signal when the formation surrounding said instrument is an infinite homogeneous bed of any conductivity, whereby the difference between said output signals provides an indication of the effect of the radial gradient in conductivity of the formation surrounding said borehole.

5. An induction well logging system as recited in claim 4 including means to record said output signals.

6. An induction well logging system as set forth in claim 1 hwerein said transmitting coil and said receiving means include a system of coils arranged to balance out mutual inductance when no conductive materials are adjacent the induction well logging system.

7. An induction well logging system comprising:
  an instrument adapted to be moved through a borehole including a transmitting coil means to apply an alternating current transmitting signal to said transmitting coil to cause said coils to apply an alternating magnetic field to the formations surrounding said borehole,
  receiving means to receive an induced alternating current signal from said formation as a result of an alternating field applied to said formation,
  first phase sensitive detecting means to produce a first component signal representing the amplitude of a first component of the signal received by said receiving means at a predetermined phase angle leading said transmitting signal, second phase sensitive detecting means to produce a second component signal representing the amplitude of a second component of the signal received by said receiving means at said predetermined phase angle lagging the transmitting signal, said first and second signal components being displaced by less than 90 degrees, and signal correcting means connected to said first means to derive a first output signal from said first component signal which would be equal to said second component signal when the formation surrounding said instrument is an infinite homogeneous bed of any conductivity, whereby any difference in said first output and second component signals will indicate the effect on the signal received by said receiving means of the radial gradient of conductivity in the formations surrounding said borehole and means for measuring the difference in said first output and second component signals.

8. An induction well logging system as recited in claim 7 including means to record said output signals.

9. An induction well logging system as set forth in claim 7 wherein said transmitting coil means and said receiving means include respective coil systems so that the received signal is zero when no conductive materials surround the induction well logging system.

References Cited

UNITED STATES PATENTS

| | | | |
|---|---|---|---|
| 2,623,923 | 12/1952 | Zimmerman | 324—5 |
| 2,903,642 | 9/1959 | Seigel | 324—6 |
| 2,929,984 | 3/1960 | Puranen et al. | 324—6 |
| 3,020,470 | 2/1962 | Shawhan et al. | 324—3 |
| 3,051,892 | 8/1962 | Huston | 324—6 |
| 3,147,429 | 9/1964 | Moran | 324—6 |
| 3,259,836 | 7/1966 | Oshry | 324—6 |
| 3,259,838 | 7/1966 | Thomsen | 324—6 |
| 3,278,839 | 10/1966 | Wells et al. | 324—40 |
| 3,337,796 | 8/1967 | Hentschel et al. | 324—40 |
| 3,398,356 | 8/1968 | Still | 324—6 |

GERARD R. STRECKER, Primary Examiner